3,504,159
ELECTRIC RESISTANCE WELDING ELECTRODE HOLDER HAVING COOLANT CIRCULATION MEANS FOR ELECTRODES HAVING APERTURES
Robert B. Width, Rochester, Mich., assignor to Tuffaloy Products, Inc., Detroit, Mich., a corporation of Michigan
Filed June 4, 1968, Ser. No. 734,496
Int. Cl. B23k 9/24
U.S. Cl. 219—120                                           1 Claim

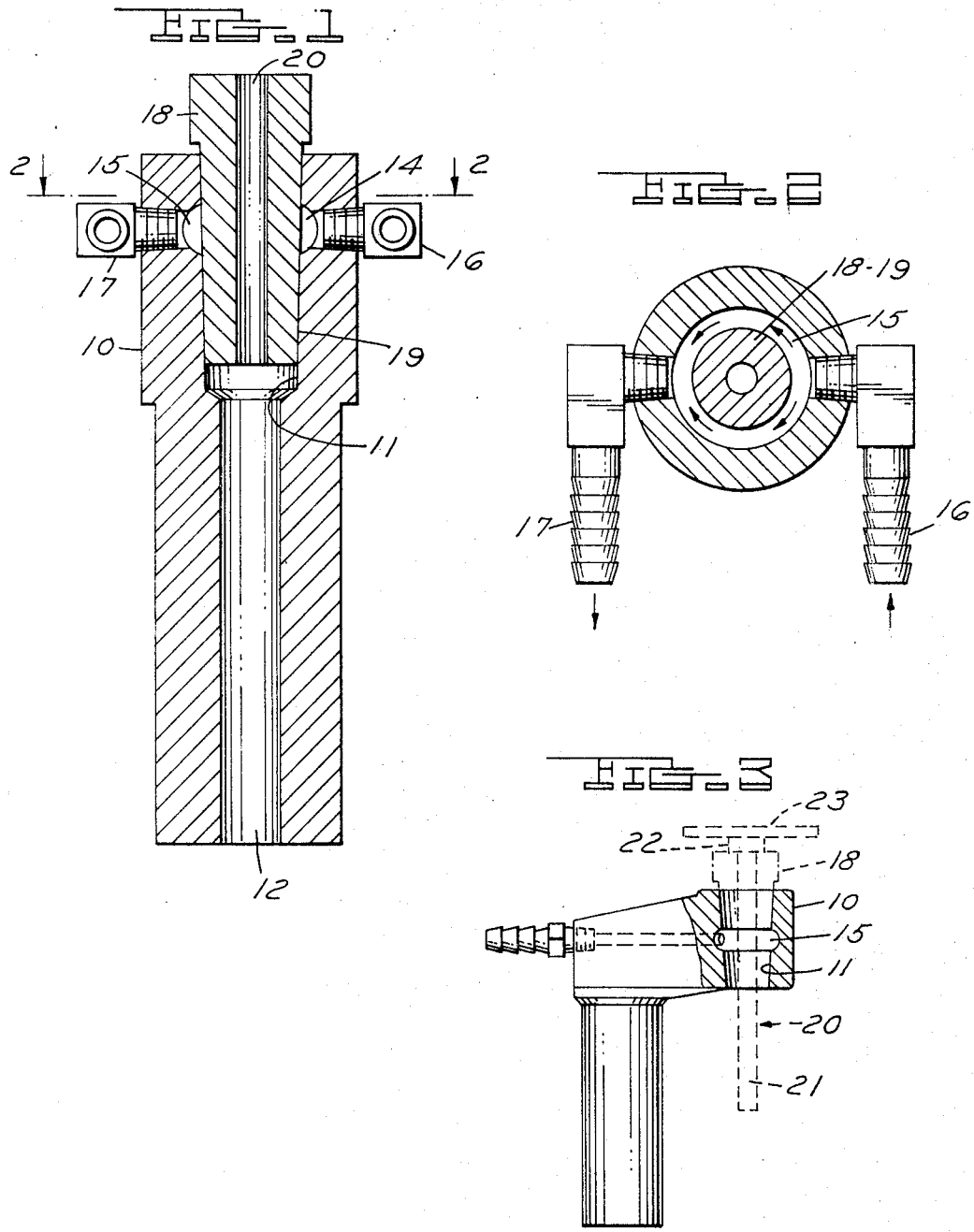

ABSTRACT OF THE DISCLOSURE

An electric resistance welding electrode holder having a tapered socket equipped with an internal peripheral groove constituting a coolant fluid circulation between connecting orifices in conjunction with an electrode having a tapered shank seated in the holder tapered socket in sealing relationship therewith above and below the channel so that coolant circulated in the channel between the orifices is in direct contact with the electrode shank to directly cool the electrode.

---

This invention relates to electric resistance welding electrode holders and in particular to coolant fluid in circulation means for electrodes having atmospherically open internal bores making circulation of coolant fluid internally of the electrode very difficult if not impossible.

A "stud welder" operation is illustrative of the invention. This comprises a hollow electrode holder equipped with an electrode having an open axial bore so that the shank of the stud may be received in the bore with the head of the stud in contact with the tip of the electode. The piece to which the stud is to be welded is positioned on the head of the stud and the opposing electrode pressed thereagainst.

Since the electrode in this regard has an axial bore open to atmosphere, it makes circulation of coolant fluid interiorly of the electrode substantially commercially impossible.

In the prior art, the holder was cooled by circulated fluid and thus heat from the electrode had to be passed through the holder with no coolant fluid in contact with the electrode itself.

With the foregoing in view, it is a primary object of the invention to provide an electrode holder having coolant circulation means which puts the electrode itself in direct contact with the circulated coolant fluid.

An object of the invention is to provide an electrode holder body which has a coolant circulation channel directly abutting the electrode.

An object of the invention is to provide an electrode holder body having a tapered socket on either side axially of the coolant fluid channel with the body socket walls sealing with the peripheral wall of an electrode shank seated in the socket on either side axially of the coolant fluid channel to confiine the coolant fluid in the channel.

An object of the invention is to provide means in the holder body for circulating coolant fluid to and from the channel in direct contact with the electrode.

These and other objects of the invention will become apparent by reference to the following description of an electrode holder having a coolant channel in direct contact with an electrode embodying the invention taken in connection with the accompanying drawing in which:

FIG. 1 is a longitudinal cross-sectional view of an electrode holder and electrode showing the channel in direct contact with the electrode and wherein the electrode has an open axial bore.

FIG. 2 is a radial cross-sectional view of the device illustrated in FIG. 1 taken on the line 2—2 thereof; and FIG. 3 is a side elevational view of an off-set holder body, partly in cross-section, showing a hollow bore electrode, a stud, and a piece in dotted lines.

Referring now to the drawing wherein like numerals refer to like and corresponding parts through the several views, the devices shown therein to illustrate the invention comprise a holder body 10, FIGS. 1 and 2, having a tapered socket 11 and an axial bore 12. The body 10 has a relatively deep internal peripheral groove 14 intermediate the upper and lower extremities of the tapered socket 11. The groove 14 walls define a channel 15 which has an open side facing radially inwardly. Orifices connect with the channel 15 in which fittings 16 and 17 are mounted on the body 10. An electrode 18 has a tapered shank 19 and an open internal bore 20. The electrode tapered shank 19 fits in the body tapered socket 11 in sealing contact on both sides of the channel 15. Coolant supplied through the orifice equipped with the fitting 16 circulates through the channel 15 in direct contact with the electrode 18 shank 19 and exits through the orifice equipped with the fitting 17 as shown by the arrows of FIG. 2.

In use, a stud 20 having a shank 21 and head 22 is dropped into the electrode 18 with the stud shank 21 in the electrode bore 12 and with the stud head 22 resting on the electrode 18, FIG. 3. A piece 23 is superposed on the stud head 22 and the opposing electrode pressed thereagainst. The piece 23 is then welded to the stud 20.

During the welding operation coolant fluid is circulated in the channel 15 in direct contact with the electrode 18 to keep it cooled. This eliminates transferring heat from the electrode 18 through the holder body 10. The coolant is also in drect contact with the holder body 10 and also cools the body 10.

While an electrode having an open bore has been shown to illustrate the invention, it is obvious that solid electrodes may similarly be cooled thereby obviating the necessity of circulating coolant internally of the electrode.

Although only a preferred embodiment and one modification of the invention has been shown and described in detail, it is obvious that many changes may be made in the size, shape, detail and arrangement of the various elements of the invention within the scope of the appended claim.

I claim:
1. An electric resistance welding electrode holder for circulating coolant fluid directly against the peripheral surface of an electrode held therein comprising,
   a holder body having a tapered socket
   an internal peripheral groove in the location of said tapered socket;
   said groove constituting a coolant circulation channel between said orifices in conjunction with an electrode seated in said socket and orifices in said holder body leading to said groove for circulating coolant to and from said groove-channel;

an electrode having a tapered shank being seatable in said socket in sealing relationship therewith on either side of groove-channel thereby closing said groove-channel to outer communication and limiting it to communication between said orifices;

coolant circulated in said groove-channel traveling between said orifices in direct contact with the electrode seated in said socket.

References Cited

UNITED STATES PATENTS

| | | | |
|---|---|---|---|
| 1,221,958 | 4/1917 | Bernard | 219—120 |
| 1,267,463 | 5/1917 | Schkommodau | 219—120 |
| 2,761,049 | 8/1956 | McElrath et. al. | 219—75 |
| 2,783,360 | 2/1957 | Osborn | 219—75 |

JOSEPH V. TRUHE, Primary Examiner

LAWRENCE A. ROUSE, Assistant Examiner